United States Patent [19]

Wang et al.

[11] Patent Number: 4,508,463

[45] Date of Patent: Apr. 2, 1985

[54] HIGH DENSITY DOT MATRIX PRINTER

[75] Inventors: An Wang, Lincoln; Phillip P. Brown, Lawrence, both of Mass.

[73] Assignee: Wang Laboratories, Inc., Lowell, Mass.

[21] Appl. No.: 438,184

[22] Filed: Nov. 1, 1982

[51] Int. Cl.³ .............................................. B41J 3/10
[52] U.S. Cl. .............................. 400/124; 101/93.05; 400/121
[58] Field of Search ............................. 400/121, 124; 101/93.04, 93.05

[56] References Cited

U.S. PATENT DOCUMENTS

| 4,086,997 | 5/1978 | Wu | 400/124 X |
| 4,159,882 | 7/1979 | Sanders, Jr. et al. | 101/93.05 X |
| 4,242,003 | 12/1980 | Ragen | 400/124 |
| 4,279,199 | 7/1981 | Blanco et al. | 400/124 X |

FOREIGN PATENT DOCUMENTS

EP56081 7/1982 European Pat. Off. ............ 400/121

OTHER PUBLICATIONS

*IBM Tech. Disc. Bulletin*, by G. L. Douglas, vol. 19, No. 8, Jan. 1977, pp. 2851–2852.

*Primary Examiner*—Paul T. Sewell
*Attorney, Agent, or Firm*—Michael H. Shanahan; Joseph E. Funk

[57] ABSTRACT

A high density dot matrix printer is disclosed which can print characters with variable font and having print resolution close to that of a typewriter. Printing on both a forward and reverse pass of a line of characters with the dot print head coupled with offsetting the dot matrix print head for the reverse pass printing doubles the line density in printing characters to increase resolution. In addition, a compacted character code arrangement is utilized having a different printing code for the reverse pass printing than for the forward pass printing, and uses single binary words to represent many dot printing positions dependent on the location of the single binary word in the character code coupled with using single binary words to represent many possible dot positions in which no dots are to be printed. This compacted character code arrangement permits the use of a relatively small amount of memory and results in operating a larger number of print head pins in printing each character than heretofore practiced in the art to greatly increase print resolution. A lower level of increased resolution printing is obtained by utilizing the compacted character code technique for the forward pass printing but deleting reverse pass printing to increase printing speed when required.

8 Claims, 6 Drawing Figures

HIGH DENSITY DOT MATRIX PRINTER

BACKGROUND OF THE INVENTION

The present invention relates to printers and more specifically to high speed dot printers.

Presently dot printers exist as dot matrix printers which take the form of a print head having a number of print pins arranged in rows and columns and the pins are individually actuated in combinations in a manner well known in the art to print characters as the print head is moved across a piece of paper or other material upon which it is desired to print the characters. Another form of a dot printer is the ink jet printer which uses a number of individual ink jets out of which droplets of ink are pulsed in combinations to print characters as a sequence of dots in a manner well known in the art. However, ink jet printers require a lot of maintenance and are relatively messy to maintain since the ink jets need frequent periodic cleaning and other than periodic cleaning as the ink jets often clog up. These two types of dot printers yield printing speeds faster than other mechanical printers such as the conventional typewriter or the daisy wheel printer to meet the need in the art for high speed printers but the print resolution or quality of existing dot printers is inferior to the resolution or quality of print obtained from typewriters and daisy wheel printers. This is due to the fact that the dots making up characters are discrete unconnected dots and thereby yield low print resolution. In addition, due primarily to this low print resolution the ability to provide variable print fonts is greatly limited. This has greatly limited the applications of dot printers. Business letters and other documents requiring high resolution characters cannot be printed on dot printers and must be printed on other printers such as the typewriter and the daisy wheel printer, both of which print at much lower speeds than the dot printers. Accordingly, in most computer and many other computer based equipment installations at least two printers are often provided. A high speed dot printer and a lower speed printer such as a daisy wheel printer are provided, one to provide printed outputs requiring high resolution and the other printer to provide high print speed outputs. Having two printers has shortcomings such as introducing extra system installation costs and extra maintenance costs.

Accordingly, there is a need in the art for a printer that can print at speeds faster than typewriters and daisy wheel printers while providing high print resolution. There is also a need in the art for a printer that can print at the high speed of a dot matrix printer while providing greater print resolution than heretofore possible with dot printers. There is also a need in the art for a single printer that can provide high speed printing equivalent to existing dot matrix printers when desired, and that can provide high resolution printing when required but at higher speeds not provided by prior art equipment.

SUMMARY OF THE INVENTION

Our invention satisfies these needs in the art by providing a technique and apparatus used with a dot matrix printer to provide high print resolution while printing at relatively high speeds. We first print forward across a row of characters using a first part of a character code for each character in the row, and then print in reverse across the same row of characters using a different second part of the character code for each character to thereby print different points for each character in the reverse pass than printed in the forward pass. When higher printing speeds are required and some print resolution can be sacrificed the row of characters are printed only on the forward printing pass but the resulting characters still have a higher resolution than typically available in the prior art because they are printed with a greater dot density than typically found in the prior art. In addition, a compacted character code arrangement is utilized providing the different printing codes for reverse pass printing and for forward pass printing, and uses single binary words to represent many dot printing positions dependent on the location of the single binary words in the character code coupled with using single binary words to represent many possible dot positions in which no dots are to be printed. This compacted character code arrangement permits the use of a relatively small amount of memory and results in operating a larger number of print head pins in printing each character than heretofore practiced in the art to achieve increased print resolution.

The preferred embodiment of our invention disclosed herein is utilized in a dot matrix printer but may be utilized with any dot printer.

One factor limiting high resolution dot matrix printing in the prior art has been the amount of memory required to store character codes indicating dots to be printed for all the printable characters. Utilizing our compacted character code arrangement a relatively small amount of memory, typically only 20% as much as is required in the prior art, is required in the electronics of the printer system while permitting more print head pins to be specified and operated per character thus enabling each printed character to have greater resolution than heretofore available in the art.

To achieve high resolution printed characters having a resolution close to or equal to the resolution obtained with a conventional typewriter or a daisy wheel printer our unique compacted character code for each character is in two parts. A first part of the two part compacted character code for each character to be printed in a row of characters is utilized to drive the pins of the print head when the head is moved across a piece of paper or other material on which the characters are being printed in a first or forward direction. Then the second part of the character code for each of the characters in the row is utilized to drive the pins of the print head as the head is moved in a second or reverse direction across the same row of characters. The second part of the character code for each character is generally different than the first part of the code and the result is that the first combination of pins operated for each character while the head is moved forward across the row of characters is different than the second combination of pins operated for each character when the head moves in reverse across the same row. In addition, the print head is vertically offset a small amount when the head travels in reverse across the same row of characters. The overall result is that a large number of dots are printed for each character and the dots are not centered on top of each other. The dots do overlap each other and result in high resolution characters.

When higher printing speed is required and some resolution can be sacrificed the operator of the printer using our novel technique and apparatus can cause the reverse row printing to be eliminated for each row of characters thereby doubling the printing speed. In this high printing speed mode the characters are printed only with the dots printed in response to the first part of the character code for each character. Due to our novel character code compaction the resolution of the characters printed in this higher printing speed mode are still higher than generally available in prior art printers.

DESCRIPTION OF THE DRAWING

Our invention will be better understood upon reading the following detailed description in conjunction with the drawing in which.

DETAILED DESCRIPTION

An example of a printer with which our invention may function is taught in U.S. Pat. No. 4,086,997 issued May 2, 1978 to Edward S. Wu and assigned to Wang Laboratories Inc. An axample of a dot matrix print head with which our invention may function is taught in U.S. Pat. No. 4,125,336 issued Nov. 14, 1978 to Ge Y. Chu and assigned to Wang Laboratories Inc. Both of these patents are incorporated herein by reference.

Figure 1:
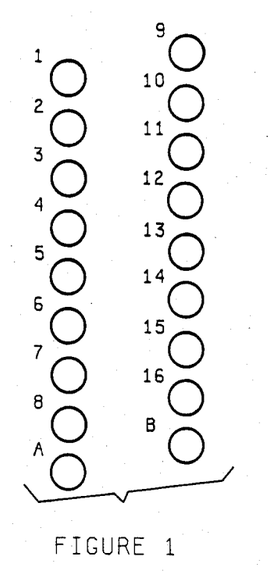
FIG. 1 is a representation of the arrangement of the pins in a dot matrix printer print head.

In dot printing of characters a position on the print medium in which a character is printed is called a character block. The character block is broken up into a number of smaller elements that identify positions in which dots can be printed to make up a character. The greater the number of elements, the greater the number of dots that may be used to print a character and therefore the greater is the resolution of the character. One limiting factor is the increased amount of memory required to store print information when a large number horizontal dots are used to print a character. Another restriction in printing high resolution characters is due to the mechanical limitation of how small pins can be made thereby determining the minimum vertical spacing between the print pins of the print head. This determines vertical resolution. FIG. 1 shows the orientation of the pins of a typical dot matrix print head. It will be noted that there are two columns each having nine pins and the two columns are vertically staggered. The physical relationship of these row staggered pins is better understood in FIG. 2 which shows only the uppermost six print pins 1, 2, 3, 9, 10, and 11 of the print head. Center lines passing horizontally through the center of these six print pins are equispaced and are shown as lines 9, 1, 10, 2, 11, and 3 in FIG. 2.

Figure 2:
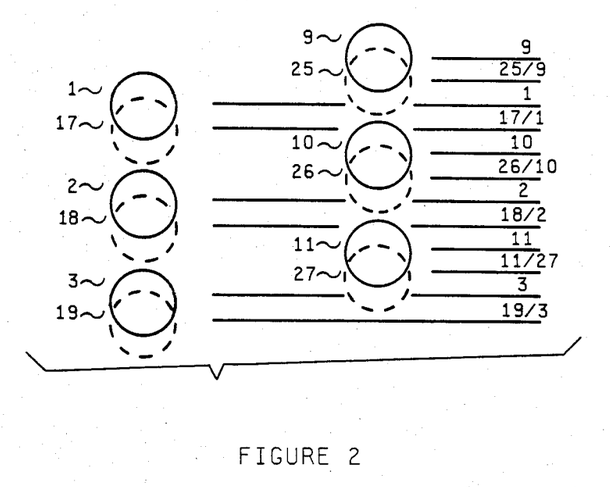
FIG. 2 is a representation of some of the print head pins and how new print lines are created when the print head is vertically offset prior to reverse pass printing of a row of characters.

In accordance with one aspect of our invention the print head is vertically offset a small amount changing the positions at which dots are printed. In FIG. 2 this vertical offset of the print head is shown by the dotted circles 17, 18, 19, 25, 26, and 27 which are the vertically offset pins 1, 2, 3, 9, 10, and 11. In FIG. 2 horizontal lines are also drawn through the center of each of the dotted circles representing the offset print pins. These horizontal lines are designated 25/9, 19/1, 26/10, 10/2, 11/27, and 19/3. The amount of vertical head offset is such that the horizontal lines listed in the last sentence are equispaced from the other lines to create twice the number of horizontal lines on which one of the print pins of the print head prints data as the head moves across a piece of paper or other material on which characters are being printed. This effectively doubles the vertical resolution of printed characters. However, the offset print head operation just described requires that each character must be printed twice, a first time with the print head in its normal position and a second time with the print head in its offset position. This is done by printing a row of characters while moving the print head in a first direction while in its normal position and then printing in reverse across the same row of characters with the print head in its offset position.

When considering dot printing of a sloped line portion of a character it is recognized that adjacent dots are located on adjacent horizontal print lines and each succeeding dot must be horizontally offset from a previous dot. I utilize the offset print head and forward and reverse printing over each row of characters to double the number of horizontal print lines a dot may be printed on. To take advantage of the increased vertical resolution increased horizontal resolution must be achieved. Without finer horizontal increments a dot printed during the reverse pass of the print head as part of a steep sloped line will be vertically above or below the adjacent previously printed dots. This is detrimental when a sloped line is being printed by a series of dots. This requires that a greater number of horizontal printing increments be created. With such increased horizontal increments in the prior art, increased horizontal resolution could be obtained but required such an increased amount of memory to store binary codes for the increased number of incremental points at which dots could be printed that the increased cost and complexity of the printers became unacceptable. With our novel technique described hereinafter we are able to create much finer horizontal resolution without increased cost and complexity by utilizing a compacted character code. Before this compacted character code is described we must first describe a character block and the printing of a character therein by prior art techniques with reference to FIG. 3.

Figure 3:
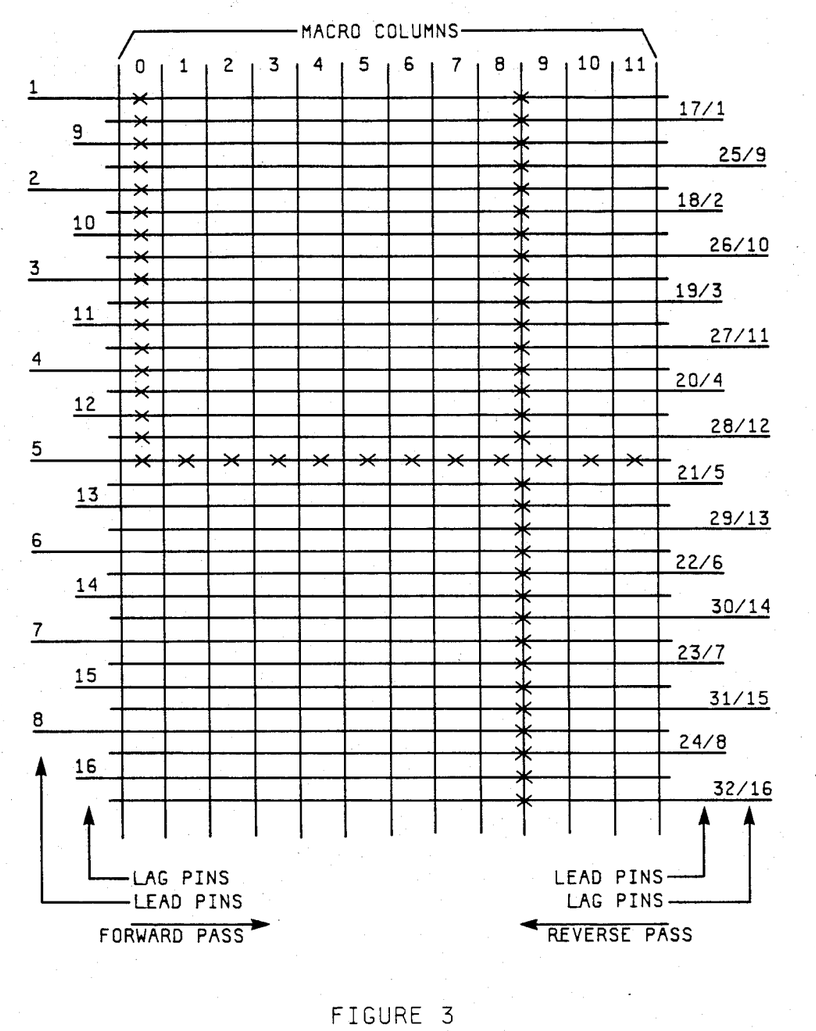
FIG. 3 is a pictorial representation useful in appreciating the number of pins that can be operated to print a character when utilizing our invention, and in creating our novel compacted character code for each printable character.

In FIG. 3 is shown a character block which is broken up into a multiplicity of rows and columns used to define locations for printing dots. In the example shown in FIG. 3 the required dot locations to print the number four are shown by the small letter x's. Typically, dot matrix printers in the prior art do not provide the fine character block breakdown for the printing of characters that is shown in FIG. 3. Referring briefly back to FIG. 1 the eighteen staggered print pins are numbered 1-16, A and B. Pins 1-16 are utilized for the printing of characters while pins A and B are used for underlining or double underlining purposes. FIG. 1 looks at the face of the print head so that as the print head is moved forwards across a piece of paper from left to right, it would be moving to the left as represented by the print head face view in FIG. 1. By definition in the art pins 1–8 are then called the lead pins while print pins 9–16 are called the lag pins. This definition is adopted because the vertical row of pins 1–8 pass an arbitrary vertical line on the print medium at one point in time and pins 9–16 pass the same vertical line on the print medium a moment later. In FIG. 3 the lead and lag pins are identified but the view is now from behind the print head and looking at the paper. The numbered horizontal lines represent the horizontal lines traversed by each of the print pins 1–16 of the print head. Depending upon the precise moments each of the pins is operated dots are printed along these lines. The right hand edge of FIG. 3 shows interlaced, equally spaced print lines created by the vertical offset of the print head when it prints a second pass over a just printed row of characters. On the bottom of FIG. 3 the arrows designated forward pass and reverse pass show which way the print head is travelling as it prints the character 4 during this two pass operation. As the print head moves from left to right across the print medium dots are printed selectively on print lines 1–16 by print pins 1–16 to print a portion of a row of characters. At the end of the line the print head motion is reversed and moves from right to left across the just printed row of characters with the print head being offset vertically in a downward direction as shown in FIG. 2 to double the vertical resolution and create sixteen more interlaced print lines as numbered on the right hand edge of the character block shown in FIG. 3. Print pin 1 is offset a small amount and is used to print along the new offset print line designated 17/1. The number 1 after the slash designates which print pin is actually doing the printing and the number 17 before the slash designates that it is a seventeenth print line. Thus, as reflected in FIG. 3 a total of thirty two horizontal print lines are created by the downward vertical offset of the print head to double the vertical resolution of printed characters. This increased vertical resolution can be seen in the vertical density of the dots that are to be printed at the locations indicated by the small x's in FIG. 3.

Figure 4:
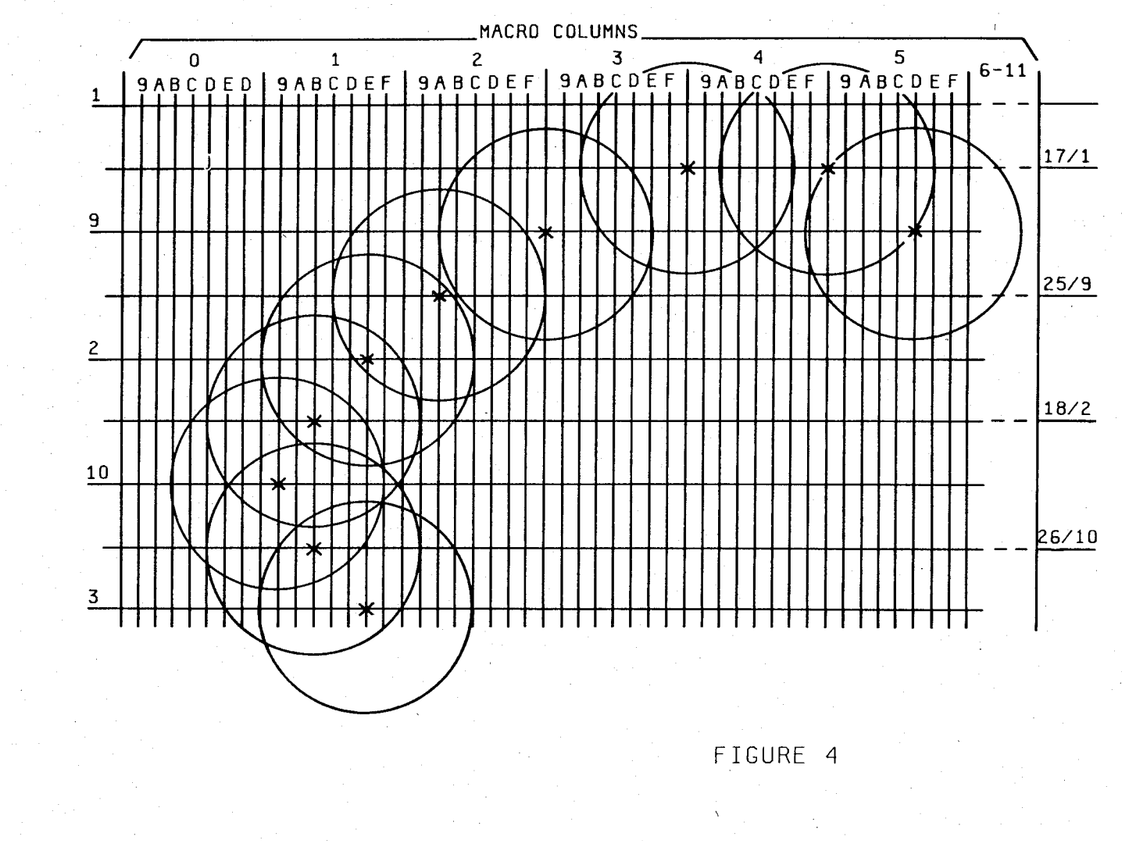
FIG. 4 is a pictorial representation of a part of the letter "S" printed with high resolution by utilizing our invention, and is also useful in understanding how our novel compacted character codes are created.

Not shown in FIG. 3 is the fact that each of the twelve horizontal divisions of each of the print lines shown as macro columns 0–11 are further broken down into eight finer sub-divisions called micro columns. These additional sub-divisions are shown in FIG. 4. FIG. 4 is a blow up of a portion of a character block showing only the first six horizontal sub divisions called macro columns 0–5 and the first ten print lines that can be printed by print head pins 1, 2, 3, 9, and 10 during the forward pass and then the reverse pass of the vertically offset print head. This represents about a quarter of the character block shown in FIG. 3. As seen in FIG. 4 each of the macro columns is further sub-divided into eight micro columns at which dots can be printed to increase the horizontal resolution. This eliminates the previously discussed problem of printing a sloped line with dots in a system with an increased vertical resolution but without an increased horizontal resolution. In the prior art this creation of ninety-six horizontal sub-divisions for the printing of each character would required ninety-six binary words requiring a great amount of memory space. To overcome this requirement for an increased amount of memory space we have developed a compacted code arrangement which is now described.

Referring back to FIG. 3, it can be seen that print pin 1 printing in print row 1 prints a dot in macro columns 0 and 9 and no dots are printed in the remaining macro columns. The coding technique by which the first dot in the middle of macro column 0 is specified is described further in this specification. Implementing the first part of our code compaction scheme we eliminate storing binary numbers for each macro columns in which no dot is printed. Rather, we utilize a single binary number to indicate a total number of macro columns in which no dots are printed. Referring to table 1 the 4-bit binary number in the Code Word column is used with our compacted code arrangement. As shown binary word 0001 to binary word 0111 indicate skipping a number of macro columns. The maximum number of macro columns that is skipped is seven by this coding arrangement and if greater than seven macro columns are skipped without printing any dots two four bit binary words are used to define the total of the skipped columns. For example, in the event that nine of the twelve macro columns are skipped before printing a dot the two binary words utilized define skipping seven macro columns and then to skip two macro columns. That is the binary word 0111 followed by the binary word 0010. Four bit binary words 1000 to 1111 in the Code Word column of table 1 indicate printing in one of the eight micro columns within each of the macro columns. The left most or highest order bit of binary numbers 1000 to 1111 is a 1 indicating that the command is to print. Looking at FIG. 4 in conjunction with table 1 it will first be noted from table 1 that there are corresponding hex characters, well known in the art, along side each of the binary numbers. These hex characters are used to explain our invention. The binary numbers with the highest order bit being a 1 correspond to the hex characters 8, 9, A, B, C, D, E, and F. It is these hex characters that are located at the top of the small horizontal sub-divisions or micro columns shown in FIG. 4.

TABLE 1

| CODE WORD | | |
| --- | --- | --- |
| Hex | Binary | DESCRIPTION |
| 0 | 0000 | do nothing |
| 1 | 0001 | skip 1 macro-column |
| 2 | 0010 | skip 2 macro-columns |
| 3 | 0011 | skip 3 macro-columns |
| 4 | 0100 | skip 4 macro-columns |
| 5 | 0101 | skip 5 macro-columns |
| 6 | 0110 | skip 6 macro-columns |
| 7 | 0111 | skip 7 macro-columns |
| 8 | 1000 | print in 1st column |
| 9 | 1001 | print in 2nd column |
| A | 1010 | print in 3rd column |
| B | 1011 | print in 4th column |
| C | 1100 | print in 5th column |
| D | 1101 | print in 6th column |
| E | 1110 | print in 7th column |
| F | 1111 | print in 8th column |

With the four bit binary words just described we go through the coding of the character 4 shown in FIG. 3 to create our novel compacted character code therefore as shown in table 2. With reference to FIG. 3 we encode each dot to be printed on each of the thirty two print lines designated 1–16 and 17/1–32/16 shown in FIG. 3. For forward pass print line 1 two dots are printed. The first dot is located exactly in the middle of macro column zero. Looking briefly at FIG. 4 this first dot is printed at the junction of micro column C and print line 1. Micro column C is the fifth column starting with the first column designated by the hex character 8 and per table 1. The binary number corresponding to the hex character C is 1100. Thereafter, macro columns 1–8, a total of eight macro columns, are skipped without printing any dots. We encode these skipped macro columns per table 1 wherein certain of the hex numbers and their corresponding four bit binary numbers indicate skipped macro columns. For skipped macro columns up to seven macro columns one of the hex number 1 to 7 is utilized. In the event that greater than seven macro columns are being skipped, which is the case in this example in FIG. 3, we first indicate skipping seven macro columns followed by an indication of the remaining number of macro columns to be skipped. In this example we skip eight macro columns which would be the command for skip seven macro columns followed by the command for skip one macro column. These two skip commands are identified by the hex numbers 7 and 1.

TABLE 2

| | Lead Pins Forward | | Lag Pins Forward | | Lead Pins Reverse | | Lag Pins Reverse |
| --- | --- | --- | --- | --- | --- | --- | --- |
| | 0A | | 14 | | 14 | | 14 |
| | 18 | | | | | | |
| P1 | 7C | P9 | 7C | P17/1 | 7C | P25/9 | 7C |
| | 81 | | 81 | | 81 | | 81 |
| | 02 | | 02 | | 02 | | 02 |
| P2 | 7C | P10 | 7C | P18/2 | 7C | P26/10 | 7C |
| | 81 | | 81 | | 81 | | 81 |
| | 02 | | 02 | | 02 | | 02 |
| P3 | 7C | P11 | 7C | P19/3 | 7C | P27/11 | 7C |
| | 81 | | 81 | | 81 | | 81 |
| | 02 | | 02 | | 02 | | 02 |
| P4 | 7C | P12 | 7C | P20/4 | 7C | P28/12 | 7C |
| | 81 | | 81 | | 81 | | 81 |
| | 02 | | 02 | | 02 | | 02 |
| P5 | CC | P13 | 27 | P21/5 | 27 | P29/13 | 27 |
| | CC | | 28 | | 28 | | 28 |
| | CC | | | | | | |
| | CC | | | | | | |
| | CC | | | | | | |
| | CC | | | | | | |
| P6 | 27 | P14 | 27 | P22/6 | 27 | P30/14 | 27 |
| | 28 | | 28 | | 28 | | 28 |
| P7 | 27 | P15 | 27 | P23/7 | 27 | P31/15 | 27 |
| | 28 | | 28 | | 28 | | 28 |
| P8 | 27 | P16 | 27 | P24/8 | 27 | P32/16 | 27 |
| | 28 | | 28 | | 28 | | 28 |

Continuing with the example of the printing of the first line of the character four shown in FIG. 3 by print pin 1, after skipping eight macro columns we print a dot in the first micro column of macro column nine. Referring briefly to FIG. 4 this first micro column is represented by the hex number 8. Referring to table 1 we note that the command to print in the first micro column is the four bit binary number 1000 and corresponds to the hex character eight. It is this binary number that is stored. Thereafter in the printing of the first line by print pin 1 we skip macro columns 10 and 11 which, when consulting table 1, is identified by the hex number two corresponding to the binary number 0010.

Thus, in table 2 for the first print head pin designated P1 we find the hex characters derived above 7C, 81, 02. The C indicates printing in the fifth micro column of macro column 0, the 7 indicates skipping seven macro columns, the 1 indicating that one more macro column is skipped, the 8 indicating that a dot is printed in the first micro column of macro column 9 and the 2 indicating 2 more skipped macro columns. The 0 is just to complete an eight bit binary word. We see that three eight bit binary words define dot printing in print line 1 in FIG. 3.

For another brief example of using the code list in table 1 to create the compacted character codes w look at the encoding for the dots printed on the forward pass by print pin 5 in FIG. 3. In this case there is a dot printed in each of the twelve macro columns. More specifically the dot is printed in the middle of each of the twelve macro columns which corresponds to the fifth micro column represented by the hex symbol C as may be seen in referring to FIG. 4. Per table 1 the hex symbol C designates printing in the fifth micro column and corresponds to the binary number 1100. To print all twelve dots defining the horizontal portion of the number four shown in FIG. 3 by print pin 5 the binary number 1100 is repeated twelve times. Each two appearances of the binary number 1100 make up an eight bit binary word so that a total of six eight-bit binary words are used. It should be noted that this is a greater number of binary words than used to designate the printing of dots by print pin 1.

The above two brief examples show our novel code compacting applied to the character codes. Rather than having a multiplicity of binary numbers each indicating a skipped macro column a single binary number is utilized to indicate a number of binary columns that are skipped. Further, a small number of four bit binary numbers are used to indicate ninety six micro columns in twelve macro columns. The coding taught in these two examples is repeated further in this specification where the complete coding for the character four is presented.

In using the shortened four bit binary words defined in table 1 in conjunction with the compacted character coding scheme just described the same four-bit binary numbers indicating skipped macro columns and also indicating printing in specific micro columns are used over and over again. This technique assists compacting of the character codes. In printing the horizontal of the character four shown in FIG. 3 print pin 5 is operated at the fifth micro column in each of the twelve macro columns. Although twelve four bit binary numbers are utilized the same binary number 1100 is utilized twelve times making up only six eight bit binary words. The particular place a four bit binary number appears in the character code indicates where a dot or space should be.

Turning now to describe in further detail how the compacted character code for the number four is made up utilizing the coding scheme shown in table 1. In table 2 is the complete compacted character code for the number four shown in FIG. 3. For simplicity the coded information is shown in hex code form. The compacted character code is grouped by pins and by lead or lag pins on a forward or reverse pass of the print head. The print pins are all prefixed with the letter P. For example, on the forward pass lead pin 1 is designated in table 2 as P1. Pin 1 is also operated on the reverse pass of the print head and is designated P17/1, the number 1 after the slash indicating that it is still pin 1 being operated but to create a new line 17 during the reverse pass. This arrangement groups the print pin operating information in four groups as shown in table 2 for pins 1 to 8, pins 9 to 16, pins 17/1 to 24/8 and pins 25/9 to 32/16. As just mentioned hereinabove pins 17/1 to 32/16 are in reality merely the reoperation of pins 1 to 16.

Stating it another way, in table 2 there are a series of hex codes associated with each pin of the print head for both forward and reverse printing passes. These hex codes indicate the position of dots to be printed and the skipped of macro columns by each of the pins. This hex coded information is arranged with two hex characters in a word, with each hex character requesting a four-bit binary number identified in table one. Thus, each word is an eight bit binary word.

At the top of each of the four columns of hex code information shown in table 2 there is header information. At the top of the first of the four columns are the hex words 0C and 18, while at the top of the remaining three columns is the hex word 14.

The hex word 0A at the top of the first column in table 2 is the first word making up a compacted character code and indicates if the character is to be printed within ten, twelve or fifteen macro columns. The hex character A indicates the character is to be printed in twelve macro columns, while the hex character B indicates the character is to be printed in fifteen macro columns, and the hex character C indicates that the character is to be printed in ten macro columns. In the first hex word 0A the A indicates that the character four is to be printed in twelve micro columns as shown in FIG. 3. At present the second four bit binary word represented by the 0 is unused but may be used to indicate any desired information regarding the character. The second hex word in the first column and the only hex word at the top of the second, third and fourth columns in table 2 indicate the number of eight word bytes that follow in the column. That is, the number of eight-bit words for the eight print pins whose printing information is located in each of the four columns. This number of bytes information is coded in binary coded decimal (BCD). In counting the number of hex words for print pins P1 through P8 we find a total of twenty four words in the first column and twenty hex words in each of the other three columns. Using the coding of table 1 the second hex word 18 in the first column represents the BCD coded binary number 00011000 for the number twenty four which is the remaining number of eight-bit binary words in the first column of table 2 and represents the printing data for pins P1 to P8. Similarly the hex word 14 at the top of the other three columns of table 2 represent the binary number 00010100 which in BCD represents the decimal number twenty. As can be seen in table 2, the last three columns each have twenty hex numbers therein following the header hex word. The number of bytes of information indicated by the header at the top of each of the columns is for the present computer to know when it has read out the printing information for eight print pens. Thus, with reference to column 1 in table 2, the computer reads the hex word 18 from character code memory and reads the twenty-four eight bit binary words that immediately follow the hex word 18. The computer then knows that the next word read out of memory, indicates the number of eight bit words for the lag pins on the forward pass and will read out the next twenty eight bit binary words to have the printing information for the print pins designated P9 through P16.

Now that the header information has been described we now describe the coding in table 2 indicating the print data for the exemplary character four in FIG. 3. In response to an indication from elsewhere in the dot matrix printer that the number four is the next character to be printed in a row of characters, the microprocessor in the system reads the character code memory location in which is stored the character code for the character four, which character code is shown in table 2. The microprocessor controls the printer and knows if the print head is printing a forward pass or a reverse pass of the row of characters. When the print head is printing a forward pass and is at the character four the microprocessor reads out of character code memory only the character code information shown in the first two columns of table 2, which is the forward pass print information for the lead pins and the lag pins. Thereafter, when the print head is printing the reverse pass of a row of characters and particularly is at the character four the microprocessor reads out the character code information stored in the character code memory shown in the third and fourth columns of table 2. As a print head is typically printing a whole row of characters the microprocessor sequentially reads out the forward pass character code information for each of the characters in the row in turn, and when the print head is then to print the reverse pass of each of the row of characters the microprocessor reads out the reverse pass character code information for each of the characters in the row also in turn but in reverse order.

The print head synchronously moves with a printer system clock that generates a number of timing signals each being a pulse train of a different frequency. The first timing signal, f1, defines the character block width as the number of macro columns required to print the character and the second timing signal, f2, defines a number of macro columns within each character block and the space on the paper traversed by each print pin between successive pulses of the third timing signal, f3, which defines a number of micro columns within each of the macro columns. The following description only describes the reading out of the character code information for the character four.

Upon the microprocessor in the dot matrix printer system determining that the next character to be printed while the print head is in its forward pass is the character four the microprocessor reads out the character code listed in the first two columns of table 2 from a character code memory into a buffer memory where it is used to control the print head. From the first binary hex word A in the header the microprocessor knows the character four will be printed in twelve macro columns as previously described. The second hex word 18 indicates to the microprocessor that the next twenty-four eight bit words read out of the character code memory will be used to operate print pins P1 through P8 during the forward pass printing of the character four. Thereafter, the microprocessor utilizes these twenty-four binary words to operate print pins P1 to P8 during the forward pass printing of the character 4.

The 7C, 81, 02 coding for the forward pass of print pin one, designated P1 in table 2, is described above and is not repeated here. It will noted from FIG. 3 that the dot configuration for pin P1 is repeated for pins P2 to P4 and P9 to P12. Thus, the coding information in the first and second columns of table 2 for all these pins is necessarily the same.

As previously described regarding FIG. 4, a dot printed in the middle of a macro column falls in hex coded micro column C which is the fifth micro column within a macro column. After printing a dot in the middle of macro column 0 dots are printed in the middle of each of macro columns 1 through 11, a total of twelve macro columns by indicating a total of six hex words CC as shown for pin P5.

The coding for pins P6 to P8 and P13 to P16 for the leg on the character four is obviously all the same and is as follows. As previously described regarding skipping in excess of seven macro columns and again referring to the definitions in table 1 the hex character 7 indicating that seven macro columns are not to be printed in followed by hex character 2 indicating that two macro columns are not to be printed in specifics that a total of nine macro columns are to be skipped. These two hex characters 7 and 2 are entered into the table 2 as shown with the 7 being the lower order bits of the hex word 27 while the 2 is the higher order bits of the same hex word. Thereafter, as we continue across print rows P6 to P8 and P13 to P16 in FIG. 3 a dot is printed in the first micro column of macro column 9. This first micro column is represented by the hex character 8 as previously described. Accordingly, the hex character 8 is placed in the lower order bits of the second hex word 28. As we continue across the rows printed by print pins P6 to P8 and P13 to P16 on the forward pass of the print head we skip macro columns 10 and 11. Per table 1 hex character 2 indicates that two macro columns are skipped. Accordingly, hex character 2 is the higher order bits of the hex word 28.

Looking again at table 2 we now discuss the hex coding for dot printing by the lead and lag pins during the reverse pass of the print head. This hex coding is located in the third and fourth columns on table 2. As previously indicated the same sixteen print pins used for printing during the forward print pass are used during the reverse pass printing with the print head vertically offset a small amount as shown in FIG. 2. For the sake of coding these are considered as pins 17–32 since they print new lines equally spaced between lines 1 through 16 printed during the forward pass of the print head. This creates a total of thirty-two print lines as shown in FIG. 3. Accordingly, as previously discussed, in table 2 these pins are designated P17/1 through P32/16, the number before the slash indicates the newly created line while the number after the slash indicates the actual pin doing the printing. Looking at the right side of FIG. 3 we note that lead pins P17/1, P18/2, P19/3, P20/4, and lag pins P25/9, P26/10, P27/11, and P28/12 all print in the exact same vertical columns as the lead and lag pens did in the forward pass of the print head. Accordingly, the hex coded printing information in table 2 is identical with that for pins P1 through P12. Similarly, it will be noted in looking at FIG. 3 that reverse printing pass lead pins P22/6, P23/7, P24/8, and reverse pass printing lag pins P30/14, P31/15, and P32/16 all print dots in the same vertical column as print pins P6 to P8 and P13 to P16 during the forward print pass of the print head. Accordingly, in table 2 the hex coded printing information for pins P22/6 through P32/16 is the same as that listed for pins P6 through P16.

Referring now to table 3, therein are shown a few of the pin entries P1, P9, P17/1, P25/9, P5 and P13 from table 2 but with the hex coded information in table 2 converted to binary information per the identities shown in table 1. It is these eight bit binary words shown in table 3 that are actually stored in the character code memory. Only this abbreviated list of eight bit binary words is shown in table 3 to conserve space and also because all other entries in table 2 are identical to and have the same binary codes as shown in table 3.

TABLE 3

| Lead Pins Forward | Lag Pins Forward | Lead Pins Reverse | Lag Pins Reverse |
|---|---|---|---|
| P1 | P9 | P17/1 | P25/9 |
| 0111 1100 | 0111 1100 | 0111 1100 | 0111 1100 |
| 1000 0001 | 1000 0001 | 1000 0001 | 1000 0001 |
| 0000 0010 | 0000 0010 | 0000 0010 | 0000 0010 |
| P5 | P13 | | |

TABLE 3-continued

| Lead Pins Forward | Lag Pins Forward | Lead Pins Reverse | Lag Pins Reverse |
|---|---|---|---|
| 1100 1100 | 0010 0111 | | |
| 1100 1100 | 0010 1000 | | |
| 1100 1100 | | | |
| 1100 1100 | | | |
| 1100 1100 | | | |
| 1100 1100 | | | |

We previously indicated that FIG. 4 only shows a small portion, that being the upper left hand corner, of an overall character block with the upper portion of the character "S". Using the character coding technique we have already described with reference to FIGS. 1 through 3, we now describe the hex coding for the ten dots of the character "S" shown in FIG. 4. Along the print line for pin 1 no dots are printed so we skip a total of twelve macro columns. Using the coding technique just described and referring to table 1 we skip seven macro columns followed by skipping five macro columns which yields the hex number 57 for the first pin designated P1 in table 4. For the print line printed by print pin 2 in FIG. 4 there is a single dot centered at micro column E of macro column 1. To code this entry for the second print pin designated P2 the first hex word is E1, the 1 indicating that the first macro column is skipped while the hex character E represents the seventh micro column of macro column 1 has the dot centered thereat. Thereafter there is no printing along print line 2 for the remaining ten columns. Per the technique described the hex number 37 indicates seven skipped macro columns followed by three skipped macro columns and thereby defines the ten skipped macro columns. Print line 3 has a dot centered at the same horizontal position as for print pin 2 so the hex information entered on table 4 for pin P3 is identical to that for print pin P2. Print line pen 9 in FIG. 4 has two dots are printed centered at micro column 8 of macro column 3 and at micro column D at macro column 5. This first requires that three macro columns first be skipped followed by printing in the first micro column of the fourth macro column which is macro column 3. Looking under the pin P9 data in table 4 we first find the hex number 83 which indicates that we skipped three macro columns followed by printing in the first micro column of the fourth macro column. Thereafter, a macro column is skipped followed by a dot centered at micro column D of macro column 5. Of the second hex number D1 from the pin P9 data the 1 indicates skipping one macro column while the D indicates a dot is centered at micro column D of the next or sixth macro column. Thereafter the remaining six macro columns (not shown) across the character block are skipped and is defined by the 6 in the third hex number 06 while the 0 merely completes the hex number and specifies that nothing else is to be done.

TABLE 4

| Lead Pins Forward | | Lag Pins Forward | | Lead Pins Reverse | | Lag Pins Reverse | |
|---|---|---|---|---|---|---|---|
| P1 | 57 | P9 | 83 | P17/1 | 34 | P25/9 | 42 |
| | | | D1 | | 68 | | 7 |
| | | | 06 | | | | |
| P2 | E1 | P10 | 91 | P18/2 | B1 | P26/10 | 31 |
| | 37 | | 37 | | 37 | | 7 |
| P3 | E1 | | | | | | |
| | 37 | | | | | | |

Print pin line 10 in FIG. 4 has only one dot centered at micro column 9 in macro column 1. Accordingly, the first hex number for pin P10 in table 4 is the hex number 91 which indicates that one macro column is skipped followed by printing in the second micro column 9 of macro column 1. Thereafter, there are no dots printed in the remaining ten macro columns which yields the hex number 37 indicating that there are seven skipped macro columns followed by three skipped macro columns.

On the reverse pass printing the first print pin line 17/1 shown in FIG. 4 has only two dots printed thereon centered at the first micro column of both macro columns 4 and 5. In coding this we get the hex numbers 84 and 68. The character 4 in the hex number 84 indicates that four macro columns are skipped and the 8 indicates that a dot is centered on the first micro column 8 of macro column 4. The character 8 in the hex number 68 indicates that there is a dot centered on the first micro column of macro column 5 while the character 6 indicates six skipped macro columns. Print line 25/9 in FIG. 4 has only a single dot centered on micro column A in macro column 2. This is coded by the hex numbers A2 and 27. The character 2 in the hex word A2 indicates that macro columns 0 and 1 are not printed in and the character A indicates that a dot is centered at micro column A of macro column 2. Hex number 27 indicates that there are seven skipped macro columns followed by two skipped macro columns. In a similar fashion all the other hex codes shown in table 4 represent the locations of the printed dots shown in FIG. 4.

The scaling of the vertical and horizontal spacings and the size of the dots shown in FIG. 4 accurately show printing of a portion of the character "S" utilizing our invention. The dots in FIG. 4 represent dots having a diameter of 0.010 inches printing a character in a character block having the dimensions 0.10 inches horizontally and 0.XX inches vertically. It can be seen from FIG. 4 that the dots overlap each other and when seen in actual size the viewer sees a continuous character rather than a series of discrete unconnected dots.

Figure 5:
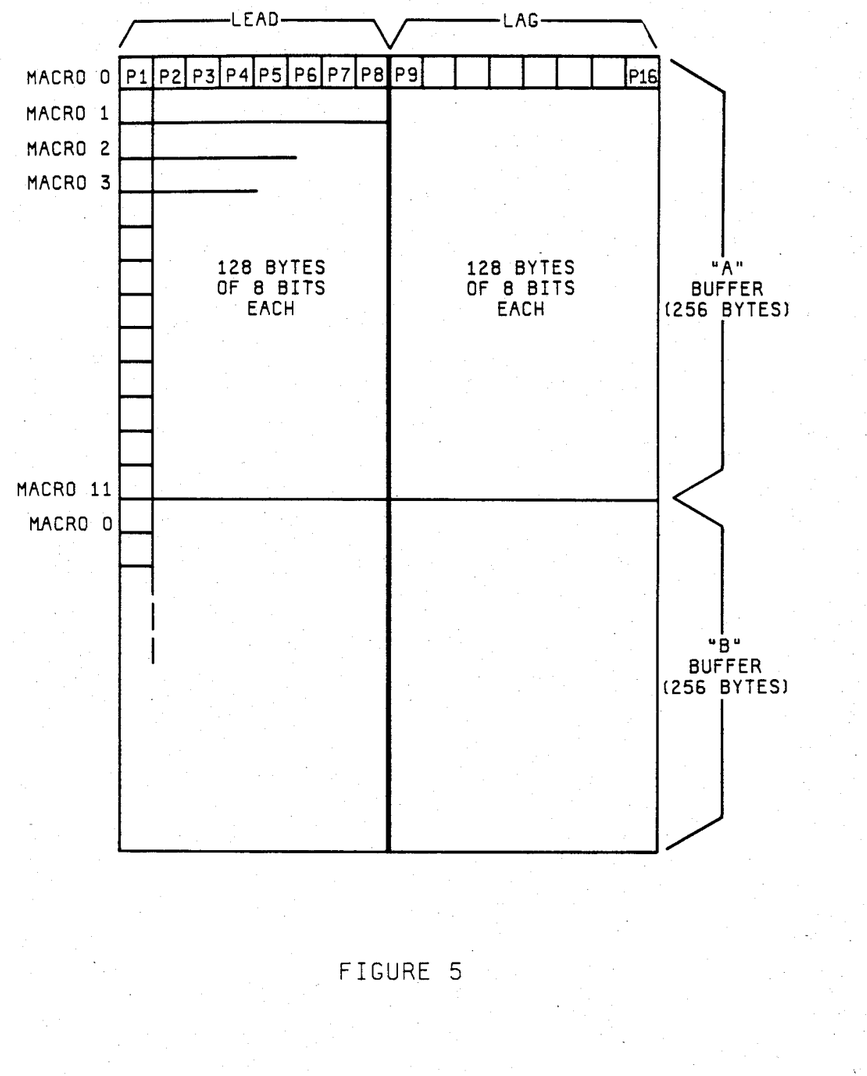
FIG. 5 is a pictorial representation of the organization of a buffer memory in which our novel compacted character codes are stored just prior to being used to print characters in a row of characters.
Figure 6:
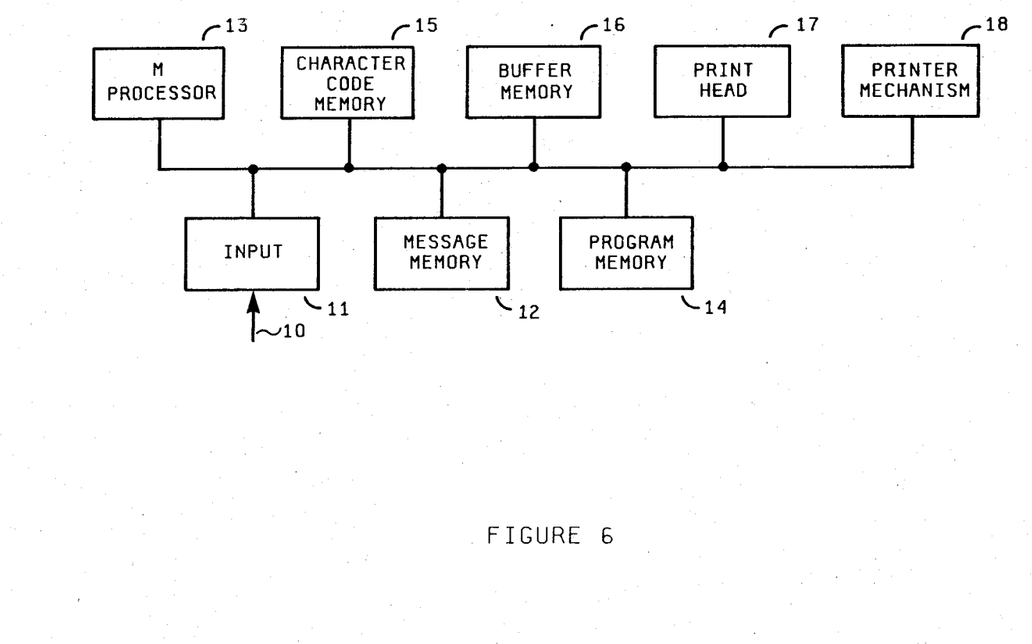
FIG. 6 is a block diagram of a dot printer in which our invention may be utilized.

Above we have described our novel compacted coding arrangement for characters to be printed on the dot matrix printer. With reference to FIG. 6, in operation the dot matrix printer receives coded information via input 11 for a document to be printed on the printer. This coded information for the document to be printed is stored in a document memory 12 which may be a separate memory or may be part of a larger memory. As the document is printed under control of the system microprocessor 13, which is turn controlled by a program in program memory 14, it sequentially reads out codes from document memory 12 indicating characters to be printed in each row, one row at a time. In accordance with one aspect of our invention we achieve high resolution by first forward pass printing each character in a row of characters and then reverse pass printing each character in the same row of characters. When the printer prints the forward pass of a row of characters it sequentially reads the characters printed in the particular row out of the document memory 12. Responsive to each of the character codes sequentially read out of document memory 12, which codes may be in a standard BCD code or in other codes standardly used with dot matrix or other printers, the corresponding compacted character code in accordance with our invention is read out of character code memory 15. The compacted character code for each character is stored in buffer memory 16 which is made up of an A buffer and a B buffer section, each having 256 bytes as represented in FIG. 5. These compacted character codes were described previously. Buffer memory 16 is organized in two parts in which the sequentially obtained compacted character codes are alternately placed. That is, for the first character in a row of characters to be printed the compacted character code is placed in the A buffer section and, immediately thereafter, the contents of this A buffer section are read out and used by microprocessor 13 to control the operation of the print pins of the print head to print the first character in the row as microprocessor 13 controls the printer mechanisms 18 to move the print head across the paper and to advance the paper. While this printing action is going on the compacted character code for the second character to be printed in the row is read out of character code memory 15 and is stored in the B section of buffer memory 16. Upon completion of printing the first character in the row the compacted character code for the second character read out of the B section of buffer memory 16 to control the operation of the print pins of the dot matrix print head to print the second character in the row. While printing of the second character is taking place the contents of the A section of buffer memory 16 are erased and the compacted character code for the third character in the row is read out of character code memory 15 and is stored in the A section of buffer memory 16. In this manner the compacted character codes for each character in the row of characters are sequentially read out of the character code memory and are alternately stored in one of the A or B sections of the buffer memory 16 from which the compacted character codes are then alternately read out to control the operation of the print pins of the dot matrix print head to print the first sixteen lines making up a row of characters in the row of characters on the forward pass of the print head.

At the end of printing a forward pass of a row of characters the print head 17 is vertically offset by microprocessor 13 and the compacted character codes for each of the characters in this row of character is again read out of character code memory 15, but in reverse order. That is, that the compacted character code for the last character in the row is first read out of character code memory 15 into buffer memory 16. This operation is obvious since on reverse pass printing of the row of characters the last character in the row is the first character to be printed, the next to the last character in the row is the second character to be printed and so on. Since each of the characters is also printed in reverse in reverse pass printing the compacted character codes sequentially stored in the A and B sections of buffer memory 16 and thence used by microprocessor 13 to control the operation of the print pins of the print head 17 must be read out of the A and B sections of buffer memory 16 in reverse order also. This is easily done as known in the art by those skilled in the dot matrix printer art in which reverse pass printing is well known. This is accomplished by generating addresses that decrement rather than increment upon each read command.

As previously mentioned in this specification our printing arrangement can double printing speed by not reverse pass printing a row of characters if the operator decides that the increased character resolution achieved with their invention may be sacrificed. In this case each row of characters is only printed by a single pass of the print head. Thus, a row of characters is printed by a forward pass of the print head while the next row of characters is printed on a reverse pass of the print head and a subsequent row of characters is again printed on a forward pass of the print head and so on as is known in the art. When this operation is chosen by the operator all the reverse pass printing information which comprises half of our compacted character code information is never utilized. By way of example, referring to table 2, the third and fourth columns of hex information for the lead pens and lag pens in reverse pass printing is not read out of character code memory 15 and transferred to buffer memory 16. In this reduced resolution printing mode selected by the operator only the compacted character code information listed in the first and second column on table 2 are read out of character code memory 15 and transferred to buffer memory.

FIG. 5 shows a pictorial representation of the organization of buffer memory 16 in which compacted character codes are stored after being read out of character code memory 15 as described hereinabove. As previously mentioned this buffer memory shown in FIG. 4 is made up of two sections designated an A buffer and a B buffer, each capable of storing 256 bytes of eight bit binary words. Each buffer has twelve rows and, as indicated, are used or associated with each of the macro columns of a character. As also described hereinabove the lead pins numbered 1 to 8 of the print head have compacted character code information associated with each of these macro columns and is stored in half of the A or B buffer. Likewise, lag pens 9 to 16 also have compacted character code information associated with each macro column and is stored in the other half of the two buffer sections. As represented in FIG. 5 by the designations P1 to P8 and P9 to P16 there is a memory section for the four bit bytes of character code associated with each pin and for each macro column for the lead and lag pins. Memories available on the market are not organized in four bit word organization so in actuality the memory used has eight bit words, the higher order four bits of each of which are not utilized in implementing our invention.

For example, in table 5 is shown some binary information organized in the form of a memory organization shown in FIG. 5 for the exemplary compacted code information shown in hex form in table 4 and representing the portion of the character "S" shown in FIG. 4. In table 5 the X preceding each four bits of binary data represents four zeros. As mentioned briefly above eight bit memories are what are available on the commercial market but our system only needs four bits thereof. Accordingly, we do not utilize the four higher order bits of each eight bit word and these higher order four bits are all zeros. For ease of presentation in table 5 the four unused higher order bits are represented by the letter X. In FIG. 4 looking across the print line associated with pin 1 we notice that no dots printed by pin 1 in any macro column. Accordingly, in table 5 in the column under the pin designation P1 the lower order four bits are zero for macro columns 0 to 5 as shown. This entry is derived from table 1 wherein four zeros indicate that nothing is to be done, that is no macro columns are to be skipped and no dots are to be printed. In actuality the binary data entered in the buffer, the organization of which is represented by table 5 is not derived using the approach just described. In table 4 for the first pin P1 the required hex number is 57 which indicates that there are seven skipped macro columns followed by five skipped macro columns. When the eight bit binary word corresponding to the hex word 57 is read out of the compacted character code memory it is translated into a total of twelve four bit words having all zeros. This brief example shows how much character code compaction is accomplished in accordance with the teaching of our invention. Returning to FIG. 4 print line traveled by print pin 2 has only one dot printed thereon in micro column E of macro column 1. The compacted character code for pin P2 is shown in table 4 as the hex words E1 and 37 which represent two eight bit binary words. When these two eight bit words are expanded from their compacted form to derive a total of twelve words which are stored in the buffer memory we have the binary numbers stored in column P2 of table 5. The derivation of these binary numbers in the column for print pin P2 is easily seen in looking at FIG. 4. On print line 2 in macro column 0 there is no dot so all zeros are entered as the first binary word in the column under P2 in table 5. Continuing in the forward pass direction across print line 2 in FIG. 4 we find a dot printed having a center at micro column E of macro column 1. Table 1 indicates that the binary number corresponding to micro column E is 1110. Accordingly the second binary word listed under column P2 in table 5 is 00001110 which is represented as X1110 in table 5. As there are no other dots printed along the remainder of print line 2 in FIG. 4 all the remaining entries under column P2 in table 5 are all zeros. This binary information is actually derived by the printer microprocessor from the compacted character code read out of the character code memory.

Skipping the binary information stored in the buffer memory for print pin 3 and looking instead at the binary information for print pin 9 we find the following. Referring to table 4 we find the hex words 83, D1, 06 stored for print pin P9 which are derived as explained in detail previously in this specification. The microprocessor first reads the hex character 3 which indicates that three macro columns are to be skipped and expands this into three eight bit binary words having all zeros as shown for the first three entries in the column under P9 in table 5. The processor then reads the hex character 8 which indicates that macro column 3 has a dot printed therein centered at the first micro column. The binary word X1000 is thus next in the column under P9. The processor then reads the hex character 1 which indicates that nothing is printed in the next macro column, which is macro column 4, so the fifth entry under column P9 in table 5 is all zeros. The microprocessor then reads the hex character D which indicates a dot is to be printed at the sixth micro column of the next macro column which is macro column 5. Thus the next binary number in column P9 is X1101. We do not go on to explain the derivation of all the other binary data shown in table 5 but its derivation will be obvious in view of the examples just given.

Now that an explanation has been given of the binary numbers stored in the buffer memory resulting from decoding the compacted character codes read out of the character code memory we return to FIG. 5 to describe how binary information stored in the buffer memory is read out thereof to operate the print pins of the print head. The lead pins of the print head physically pass a vertical reference line on the piece of paper or other material on which a row of characters is being printed shortly before the lag pins pass this same point due to the physical orientation of the lag pins with respect to the lead pins. Therefore, the lag pins must be operated shortly after the operation of the lead pins to print along the vertical reference line. Accordingly, the micro processor of the printer system reads the eight binary words represented by columns P1 to P8 in FIG. 5 for macro 0 out of buffer memory and then a moment later reads out the eight binary words represented by columns P9 to P16. This assures that the lag print pins print in vertical registration with the lead print pins. This operation also requires that the eight binary words for all of pins P1 to P8 and P9 to P16 for any specific macro column be available simultaneously for the simultaneous operation of none, some or all of the eight lead pins, and then similarly for all eight lag pins. To achieve this operation the system micro processor sequentially reads out the eight bit binary words for print pins P1 through P8 into another memory storage from where they are used in parallel form to simultaneously operate particular ones of print pens P1 through P8 as required.

As previously described the decoded and expanded character print information derived from the compacted character code is stored in the A buffer and subsequently the same information for the next character in the row of characters is stored in the B buffer section. After the information stored in the A buffer is used to operate the print pens of the print head to print the first character the information stored in the B buffer is then read out and used to control the operation of the print pens of the print head to print the second character in the row. While the second character in the row is being printed all memory locations on the A buffer section are cleared to zero and the information for the third character in the row is written in the A buffer section. Upon completion of printing of the second character in the row the information now stored in the A buffer section is read out to be used to print the third character in the row. While the third character in the row is being printed all memory locations in the B buffer section are cleared to zero and the information for printing the fourth character in the row is stored in the B buffer section. Thus the need for two buffer sections is seen to provide continuous and fast printing of each character in a row.

At the end of a forward printing pass the lead and lag pin reverse printing information is read out of the compacted character code memory, is decoded and expanded into binary words which are again alternately stored in the A buffer section or the B buffer section. However, due to the fact that the print head first prints the last character in the row followed by the next to the last character in the row and so forth and also prints the last macro column of each character first and the first macro column of each character last the addressing of the compacted code memory and the buffer memory is changed so that the addresses are decremented rather than incremented to thereby read the memory backwards. That is, higher order address locations are read out before lower address memory locations. Thus, the print head is vertically offset at the end of a forward printing pass and a reverse printing pass is accomplished in the row of characters being printed being properly printed during the reverse printing pass.

It would be recognized by those skilled in the art that numerous variations may be made in our invention without departing from the spirit and scope thereof. For example, the system could be modified to print different dots on two or more printing passes of the print head without either offsetting the head or moving the paper in between each pass. In addition, the printing head can be offset to more than one other position for different printing passes with the head. Still further, it would be recognized by those skilled in the art that the teaching of the subject invention could be applied to ink jet dot printers.

TABLE 5

|  | P1 | P2 | P3 | P9 | P10 | P17/1 | P18/2 | P25/9 | P26/10 |
| --- | --- | --- | --- | --- | --- | --- | --- | --- | --- |
| MACRO 0 | X0000 | X0000 | X0000 | X0000 | X0000 | X0000 | X0000 | X0000 | X0000 |
| MACRO 1 | X0000 | X1110 | X1110 | X0000 | X1001 | X0000 | X1011 | X0000 | X1011 |
| MACRO 2 | X0000 | X0000 | X0000 | X0000 | X0000 | X0000 | X0000 | X1010 | X0000 |
| MACRO 3 | X0000 | X0000 | X0000 | X1000 | X0000 | X0000 | X0000 | X0000 | X0000 |
| MACRO 4 | X0000 | X0000 | X0000 | X0000 | X0000 | X1000 | X0000 | X0000 | X0000 |
| MACRO 5 | X0000 | X0000 | X0000 | X1101 | X0000 | X1000 | X0000 | X0000 | X0000 |

What we claim is:

1. A method for printing a sequence of characters using a compacted character code for controlling the operation of the print pins of a dot matrix printer print head to print characters on a piece of material, where each print pin is actuated in sequence to print dots along an individual row and collectively the dots printed by all print pins of the print head print characters in character blocks while the print head and material are moved relative to each other, said character blocks being divided into rows and columns of dot positions in selected ones of which dots are printed by said print head to print a character, and comprising the steps of:
   (a) generating a first sequence of codes each specifying a different number of macro columns that are not to have a dot printed therein;
   (b) generating a second sequence of codes each specifying a different one of the micro columns within a macro column at which a dot is to be printed, where in each row of dots in each character block a predetermined number of adjacent dots are grouped to create said macro columns, and each dot in one of said macro columns falls in a micro column; and
   (c) specifying a combination of ones of said first sequence of codes and ones of said second sequence of codes for each print pin of said print head, where the code combinations for all print pins define the dots used to print a character, and the combination of codes for all print pins is used to control the operation of said print head pins to print dots defining a character.

2. A method of printing a sequence of characters using a dot matrix printer comprising:
   (a) storing in memory for each character to be printed, a compacted character code to control the printing, non-printing, and the skipping of major columns in a character block and the skipping of minor columns within said major columns, of each of the print pins in a printhead;
   (b) specifying a first character to be printed;
   (c) retrieving from memory the first portion of the compacted character code for the first character to be printed associated with the forward scan of the printhead and storing the retrieved code in the first part of a buffer memory;

(d) printing dots making up the first character in response to the first portion of the compacted character code for the first character stored in said buffer memory;

(e) retrieving from memory the first portion of the compacted character code for the second character to be printed associated with the forward scan of the printhead and storing the retrieved code in the second part of said buffer memory;

(f) printing dots making up the second character in response to the first portion of the compacted character code for the second character stored in said buffer memory;

(g) clearing said first part of said buffer memory following the printing of said first character;

(h) repeating steps (b) through (d) for a third character;

(i) clearing said second part of said buffer memory following the printing of said second character, and repeating steps (b), (e), and (f) for a fourth character.

3. A method of printing a sequence of characters comprising the steps of:

(a) providing a printer having a printhead mounted for a scan along parallel printlines, the printhead including substantially vertical lead and lag columns of print pins wherein a printer control means controls the printing or non-printing of the print pins in response to a code;

(b) defining major divisions of a character block called macro columns and divisions within said macro columns as micro columns, and defining a character block width as the number of macro columns needed to print the character;

(c) producing a code to effect the printing of characters including the steps of:

(i) generating a first code specifying a character block width associated with a character to be printed, (ii) generating a second code specifying the number of binary words required to operate the column of lead pins and the column of lag pins during the scan of the character block, (iii) generating a third code including a sequence of binary words which specify the macro and micro columns to print in, and the number of macro columns to skip between the printing of dots during the scan of a character block.

4. The method of printing a sequence of characters in claim 3 further comprising the steps of:

specifying a first combination of binary codes for each character from the following list:

| CODE WORD | | |
|---|---|---|
| Hex | Binary | DESCRIPTION |
| 0 | 0000 | do nothing |
| 1 | 0001 | skip 1 macro-column |
| 2 | 0010 | skip 2 macro-columns |
| 3 | 0011 | skip 3 macro-columns |
| 4 | 0100 | skip 4 macro-columns |
| 5 | 0101 | skip 5 macro-columns |
| 6 | 0110 | skip 6 macro-columns |
| 7 | 0111 | skip 7 macro-columns |
| 8 | 1000 | print in 1st column |
| 9 | 1001 | print in 2nd column |
| A | 1010 | print in 3rd column |
| B | 1011 | print in 4th column |
| C | 1100 | print in 5th column |
| D | 1101 | print in 6th column |
| E | 1110 | print in 7th column |
| F | 1111 | print in 8th column | where the binary numbers 0000 through 0111 comprises a first sequence of codes each specifying a different number of macro columns that are not to have a dot printed therein by ones of said print head pins and the binary numbers 1000 to 1111 comprise a second sequence of codes each specifying a different one of the micro columns within a macro column and at which a dot is to be printed centered at the micro column, said first combination of codes defining the dot printing of each character in the sequence by said print pins by a first series of dots, where ones of said first sequence of codes are used to define spaced between dots along each print line in each character block and between dots and the edge of each character block along each print line, and ones of said second sequence of codes define the micro column within each macro column of each character block along each print line at which the printed dots are to be centered, and said printer control means responds to said first combination of character codes to print said sequence of characters.

5. The method in accordance with claim 3 where the first combination of codes is used to operate the print pins as the print head moves across the paper in printing the sequence of characters and at the end of printing the sequence of characters the print head is vertically offset so the print pins will print on new print lines in between the print lines first traversed by the print pins, and the print head then moves across the paper again over the just printed sequence of characters to print more dots for each character in the sequence with the last mentioned dots thereby not being centered on top of the dots printed responsive to said first combination of codes but can overlap same to improve the resolution of the characters in the row and further comprising the step of:

specifying a second combination of ones of said first sequence of codes and ones of said second sequence of codes in the same way as said first combination of codes is specified, said second combination of codes being different than said first combination of codes and being used by said printer drive circuit to control the print pins of said print head to print a second series dots for each of the sequence of characters to improve the resolution thereof.

6. The method in accordance with claim 4 where the first combination of codes is used to operate the print pins as the print head moves across the paper once in printing the sequence of characters, at the end of printing the sequence of characters the print head is vertically offset so the print pins will move and print on new print lines in between the print lines first traversed by the print pins when the print head moves across the sequence of characters and the print head again moves across the paper over the just printed sequence of characters to print more dots for each character in the sequence with the last mentioned dots thereby not being centered in top of the dots printed responsive to said first combination of codes but can overlap same to improve the resolution of the characters, and further comprising the step of:

specifying a second combination of ones of said first sequence of codes and ones of said second sequence of codes in the same way as said first combination of codes is specified, said second combination of codes being different than said first combination of codes and being used by said printer drive circuit to control the operation of said print head print pins to print a second series dots for each character to improve the resolution thereof.

7. The method in accordance with claim 4 where the first combination of codes is used to operate the print pins as the print head moves across the paper in printing the sequence of characters and at the end of printing the sequence of characters the print head is vertically offset so the print pins will print on new print lines in between the print lines first traversed by the print pins, and the print head then moves across the paper again over the just printed sequence of characters to print more dots for each character in the sequence with the last mentioned dots thereby not being centered on top of the dots printed responsive to said first combination of codes but can overlap same to improve the resolution of the characters in the row and further comprising the steps of:

specifying a second combination of ones of said first sequence of codes and ones of said second sequence of codes in the same way as said first combination of codes is specified, said second combination of codes being different than said first combination of codes and being used by said printer drive circuit to control the print pins of said print head to print a second series dots for each of the sequence of characters to improve the resolution thereof.

8. The method in accordance with claim 4 where the first combination of codes is used to operate the print pins as the print head moves across the paper once in printing the sequence of characters, at the end of printing the sequence of characters the print head is vertically offset so that print pins will move and print on new print lines in between the print lines first traversed by the print pins when the print head moves across the sequence of characters and the print head again moves across the paper over the just printed sequence of characters to print more dots for each character in the sequence with the last mentioned dots thereby not being centered in top of the dots printed responsive to said first combination of codes but can overlap same to improve the resolution of the characters, and further comprising the step of:

specifying a second combination of ones of said first sequence of codes and ones of said second sequence of codes in the same way as said first combination of codes is specified, said second combination of codes being different than said first combination of codes and being used by said printer drive circuit to control the operation of said print head print pins to print a second series dots for each character to improve the resolution thereof.

\* \* \* \* \*

UNITED STATES PATENT AND TRADEMARK OFFICE
CERTIFICATE OF CORRECTION

PATENT NO. : 4,508,463

DATED : April 2, 1985

INVENTOR(S) : An Wang, Philip P. Brown

It is certified that error appears in the above-identified patent and that said Letters Patent is hereby corrected as shown below:

In column 20, claim 6, reference numeral "4" should read --3--.

Signed and Sealed this

First Day of July 1986

[SEAL]

Attest:

DONALD J. QUIGG

Attesting Officer

Commissioner of Patents and Trademarks